July 29, 1958

R. A. BURBERRY 2,845,624

LOW DRAG AIRPLANE ANTENNA

Filed May 5, 1954

Inventor
R. A. BURBERRY
By Philip M. Bolton
Attorney

July 29, 1958 R. A. BURBERRY 2,845,624
LOW DRAG AIRPLANE ANTENNA
Filed May 5, 1954
2 Sheets-Sheet 2
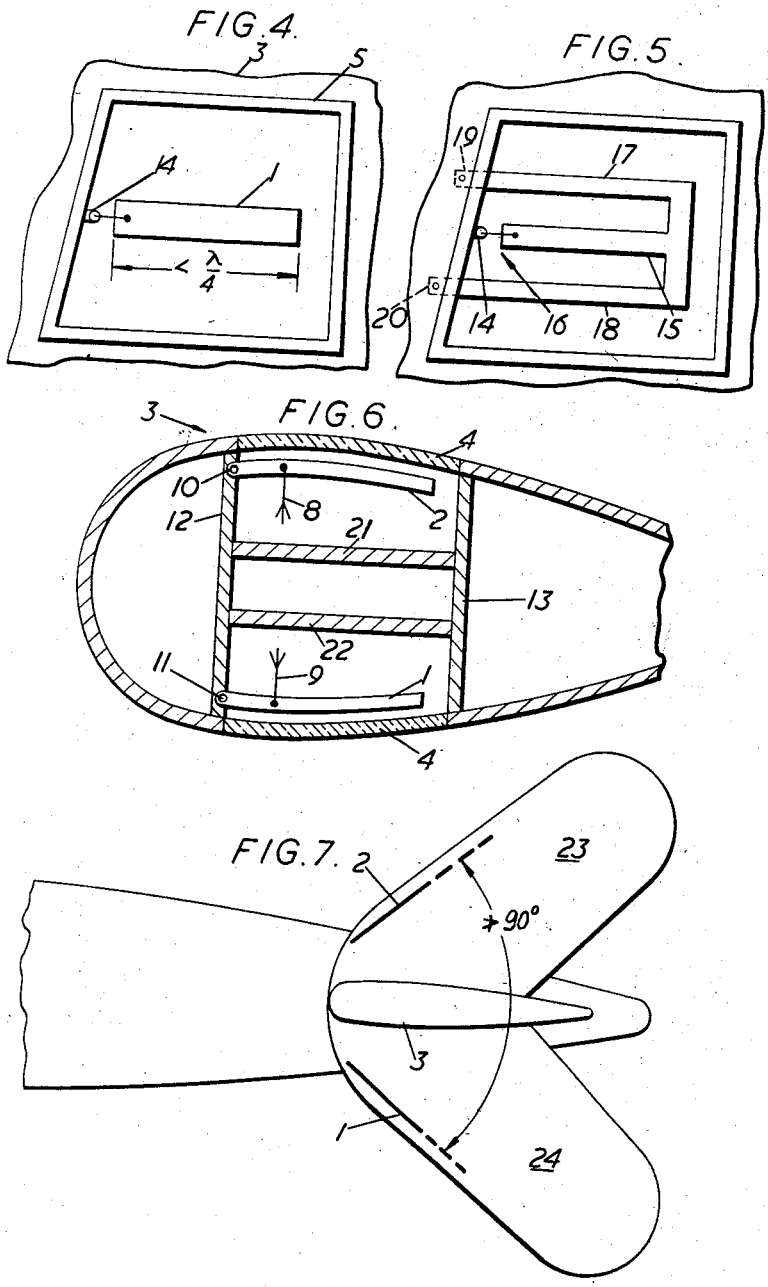
Inventor
R. A. BURBERRY
By Philip M. Bolton
Attorney United States Patent Office 2,845,624
Patented July 29, 1958

2,845,624

LOW DRAG AIRPLANE ANTENNA

Richard Allan Burberry, London, England, assignor to International Standard Electric Corporation, New York, N. Y., a corporation of Delaware Application May 5, 1954, Serial No. 427,798

Claims priority, application Great Britain May 8, 1953

5 Claims. (Cl. 343—708)

This invention relates to aerial installations of the suppressed or low drag type and has for its object to provide a suppressed aerial installation for aircraft or like vehicles having a streamlined envelope, in which the aerial radiation pattern is substantially circular in the azimuth plane.

For various airborne radio systems a horizontal polarized aerial is required whose radiation pattern is substantially circular in the azimuth plane. Such a pattern is particularly desirable for the reception of blind approach beacon signals. Prior art arrangements giving a suitable pattern include a dipole aerial mounted above or beneath the aircraft fuselage with the arms of the dipole bent to form a U or a V or even a nearly circular configuration, in plan. An objection to this form of aerial is that the aerial structure and its supports have to be very strong to withstand the airloads to which they are subjected at high speeds, and they have considerable aerodynamic drag. A speed limit is reached with modern aircraft at which such aerials can be made structurally sound only at the cost of excessive drag.

It is therefore an object of the present invention to provide an aerial system having good omni-directional radiation characteristics and contained wholly within the skin of the vehicle so as to contribute no extra drag load.

In order to achieve this object, according to the present invention, a suppressed aerial installation for an aircraft or other vehicle having a streamlined envelope comprises a pair of conducting aerial elements symmetrically located within and adjacent to said envelope on horizontally opposed sides of the main longitudinal axis of the vehicle and extending substantially horizontally with the angle included between the directions of rearward extension not exceeding 90°, a pair of flush-mounted radiation windows in said envelope located to face respective ones of said aerial elements, and a feeder system adapted to couple said aerial elements to a radio equipment in such manner that said elements serve as respective monopole members of a dipole aerial.

The invention will be better understood from the following description of several embodiments illustrated by the accompanying diagrammatic drawings in which:

Fig. 4 illustrates a simple form of radiation element suitable for use in embodiments of the invention.

Fig. 5 illustrates a form of radiation element alternative to that shown in Fig. 4.

Fig. 6 illustrates a modification of the arrangements shown in Fig. 1 which is particularly suitable when the width of the tail fin exceeds about ⅕ of an operating wavelength.

Fig. 7 illustrates an embodiment of the invention in which the radiating parts of the aerial are mounted towards the leading edge of a swept back tail plane of an aircraft.

In the drawings the same item is designated throughout the several figures by the same reference numeral.

Figure 1:
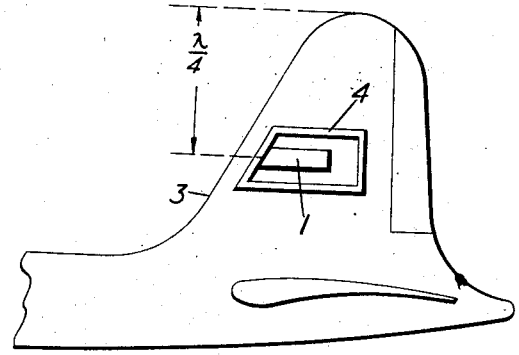
Fig. 1 illustrates the positioning of an aerial system according to the invention within the tail fin of an aircraft.
Figure 2:
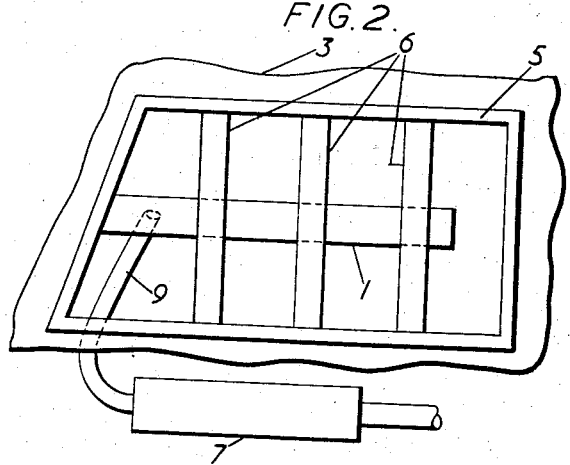
Fig. 2 is an elevation view illustrating details of the arrangement of Fig. 1.
Figure 3:
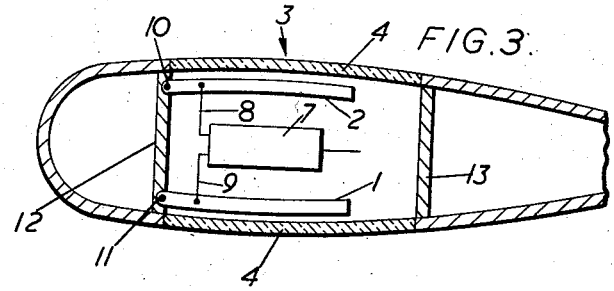
Fig. 3 is a plan view further illustrating the arrangement in Fig. 1 in detail.

Referring now to Figs. 1, 2 and 3 conjointly, there is illustrated therein an aerial system comprising radiation elements 1 and 2 located on opposite sides of an aircraft tail-fin indicated at 3. The elements 1 and 2 are fitted substantially flush with the skin of the tail fin in such manner that the two elements are substantially horizontal with their directions in the horizontal plane forming only a small angle which lies within 90°. Each element is mounted opposite a radiation window as shown at 4 in the tail fin surface. By "radiation window" is meant simply an aperture through which the field of electro-magnetic waves can freely pass, the window panel being formed flush with the skin of the tail fin and being made of low loss insulating material such as laminated glass fibre sheet or Bakelite. These window panels may be adapted to support the aerial elements if desired or may solely act as covers for the aerial system within the tail fin. As shown in Fig. 2 the window panel is attached to the main body of the tail fin by means of mounting flange 5 which in this case also carries three insulated supports indicated at 6, on which is mounted the associated aerial element. The two elements are mounted within the tail fin so that they are not less than one quarter of a wavelength at the lowest operating frequency from the highest point of the fin, as indicated in Fig. 1. This limitation has for object to minimise the radiation or reception of energy of undesired polarisation. The elements 1 and 2 are connected to receiving or transmitting radio equipment by a feeder arrangement such that a phase-shift of 180° arises between the two elements. In the arrangement illustrated in Figs. 2 and 3 this phase difference is obtained by connecting the equipment through a balance-to-unbalance unit 7 having a coaxial input and balanced output, the output conductors 8 and 9 being connected to the two elements. Alternatively, the individual elements may be fed by individual coaxial cables differing in length by an odd number of half wavelengths.

The elements 1 and 3 may consist of plates curved to suit the contour of the tail fin and are preferably slightly less than one quarter wavelength long, and electrically bonded to the vehicle frame at their forward ends, 10 and 11 (Fig. 3), the rear ends being left free, and the feeder conductors 8 and 9 coupled at points intermediate the ends of the plate. Preferably, the aerial arrangement is included in a cavity defined by the surfaces of the tail-fin and by two metallic partitions across the aerofoil as indicated at 12 and 13. These partitions should be so placed that the effect of the cavity on the aerial elements is such that no additional tuning of the elements is required.

Referring to Fig. 4, this shows the case in which the radiating element is formed by a plate 1 which is connected at its forward end to the feeder 14 and is left free at the other end. With this construction the aerial length must be less than an exact quarter wavelength long as the paralleled plate transmission line formed by the aerial and the sides of the aperture or window will present very low impedance in parallel with that of the aerial. If however, the aerial be shortened and likewise the window, the resulting capacitive impedance will compensate the aerial impedance. This arrangement however, has rather a narrow band width.

Referring to Fig. 5, there is illustrated therein a form of an aerial element consisting of a central portion 15 fed at one end 16 by feeder 14 and having the other end connected to two folded back portions 17 and 18 which are bonded to the vehicle frame at their ends 19 and 20 adjacent to the feeder. This arrangement has the advantage that it eliminates the parallel impedance due to the aperture.

In the forms of the aerial so far described, there is no conducting barrier between the two aerial elements. Where however, the thickness of the fin exceeds about one fifth of each wavelength it may be desirable to divide the thickness by one or more vertical conducting sheets as indicated at 21 and 22 in Fig. 6, spaced from respective aerial elements by one tenth wavelength. Such a change will of course alter the impedance system but has only a negligible effect on the radiation pattern. The change in impedance may be allowed for suitably shifting the points of connection of the feeder output conductors 8 and 9. In this form the use of the aerial is not limited to the tail fin or similar member of the aircraft. The separate aerial elements with their associated cavitites may be fitted on the leading edges of either side of an aircraft nose, or in respective halves 23 and 24, a swept back wing or tail-plane as indicated for example in Fig. 7, provided that the angle included between the directions of the two aerial members does not exceed 90°.

While the principles of the invention have been described above in connection with specific embodiments, and particular modifications thereof, it is to be clearly understood that this description is made only by way of example and not as a limitation on the scope of the invention.

What I claim is:

1. An aerial installation for a vehicle having a streamlined electrically conducting envelope, comprising a pair of conducting aerial elements symmetrically located within and adjacent to said envelope on horizontally opposed sides of the main longitudinal axis of the vehicle and extending substantially horizontally with the angle included between the directions of rearward extension not exceeding 90°, means mounting said elements at least one quarter of the operating wavelength below the highest part of said vehicle, a pair of flush-mounted radiation windows in said envelope located to face respective ones of said aerial elements, and a feeder system adapted to couple said aerial elements to a radio equipment in such manner that said elements serve as respective monopole members of a dipole aerial.

2. An aerial installation according to claim 1, in which the spacing between said two aerial elements exceeds one fifth of a wavelength at the operating frequency, further comprising vertical metal sheet means located between said aerial elements and adapted to provide mirror surfaces therefor.

3. An aerial installation according to claim 1, in which each said aerial element is formed by a metal plate connected at one end to the feeder system but free at the other end, the length of said plate being less than one quarter of an operating wavelength.

4. An aerial installation according to claim 1, in which each said aerial element is formed by a metal plate connected at its forward end to said envelope but free at the other end, said plate being connected to said feeder system at a point intermediate the ends of the plate.

5. An aerial installation according to claim 1, in which each said aerial element comprises a centre arm connected at one end to said feeder system and connected at its other end to each of two folded-back side arms, the otherwise free ends of said side arms being connected to said envelope.

References Cited in the file of this patent

UNITED STATES PATENTS

| | | |
|---|---|---|
| 2,242,200 | Woods | May 13, 1941 |
| 2,431,124 | Kees et al. | Nov. 18, 1947 |

FOREIGN PATENTS

| | | |
|---|---|---|
| 651,806 | Great Britain | Apr. 11, 1951 |

OTHER REFERENCES

"Dayton IRE Airbourne Radio Conference," page 37, Tele-Tech, July 1949.